Aug. 13, 1957  R. O. HELGEBY  2,802,442
IN-LINE SPEEDOMETER INDICATOR
Filed May 21, 1952

Inventor
Ralph O. Helgeby
By Willits, Helwig & Baillie
Attorneys

United States Patent Office 2,802,442
Patented Aug. 13, 1957

2,802,442

IN-LINE SPEEDOMETER INDICATOR

Ralph O. Helgeby, Flint, Mich., assignor to General Motors Corporation, Detroit, Mich., a corporation of Delaware Application May 21, 1952, Serial No. 289,178

3 Claims. (Cl. 116—57)

This invention relates to speedometer indicators and in particular to improvements in in-line type speedometer indicators.

The primary object of the invention is to provide improved in-line speedometer indicators of the barber-pole type mountable horizontally on the dash panels of automobiles presenting visually a transversely movable pointed column or ribbon between upper numerical indicia indicating generally the vehicle speed of travel and lower graduations or indicia indicating precisely the vehicle speed of travel, the said point of the visually presented transversely movable column or ribbon being in registry with the said lower graduations.

A further object of the invention is to provide an improved in-line type speedometer indicator having easily readable precise mileage indicating characteristics.

Other objects of the invention will become apparent by reference to the following detailed description taken in connection with the accompanying drawings, in which.

Figure 1:
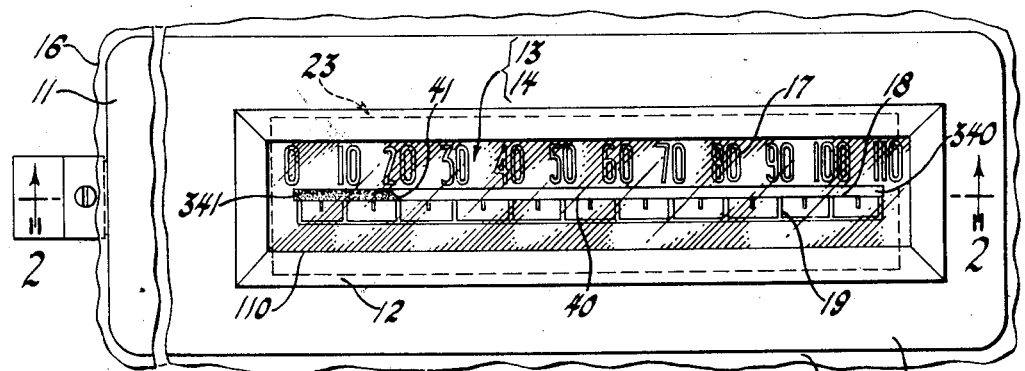
Fig. 1 is an elevational view of a preferred embodiment of an in-line speedometer indicator embodying the invention mounted in its horizontal position on an instrument panel.
Figure 2:
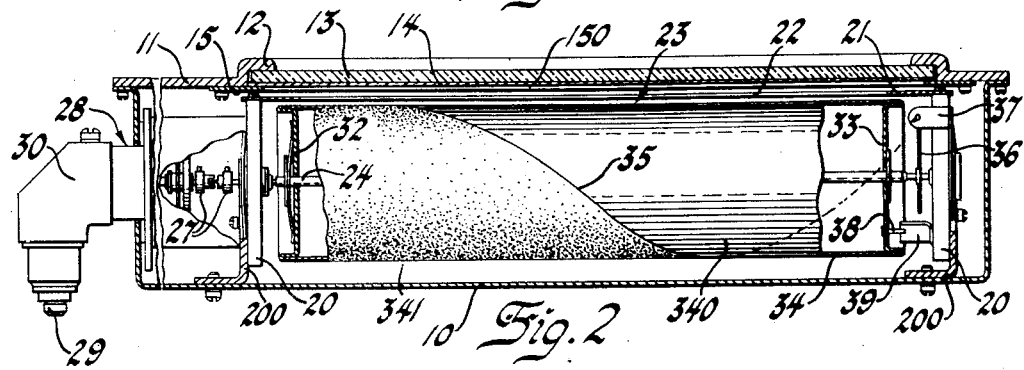
Fig. 2 is a horizontal longitudinal sectional view taken on the line 2—2 of Fig. 1 looking in the direction indicated by the arrows.

Referring now to the drawing wherein like numerals refer to like and corresponding parts throughout the several views, the particular embodiment of an in-line speedometer indicator shown for the purpose of illustrating the invention comprises a casing 10 having one open side over which is mounted a face panel 11 formed to provide a rectangular aperture 110 with a bezel 12 therearound behind which is positioned a flat transparent plastic or glass window 13 and an indicia element 14. A retainer plate 15 having a rectangular aperture 150 therein a secured by suitable fastening means to the rear of the face panel 11 and retains the window 13 and indicia element 14 therebehind against the bezel 12. The entire casing 10 is fixed to the instrument panel 16 over a suitable aperture therein by conventional means, not shown. The indicia element 14 is preferably opaque except for the upper numerical indicia 17, the horizontal band 18 and the lower graduations 19 thereof which are translucent.

Figures 3, 4:
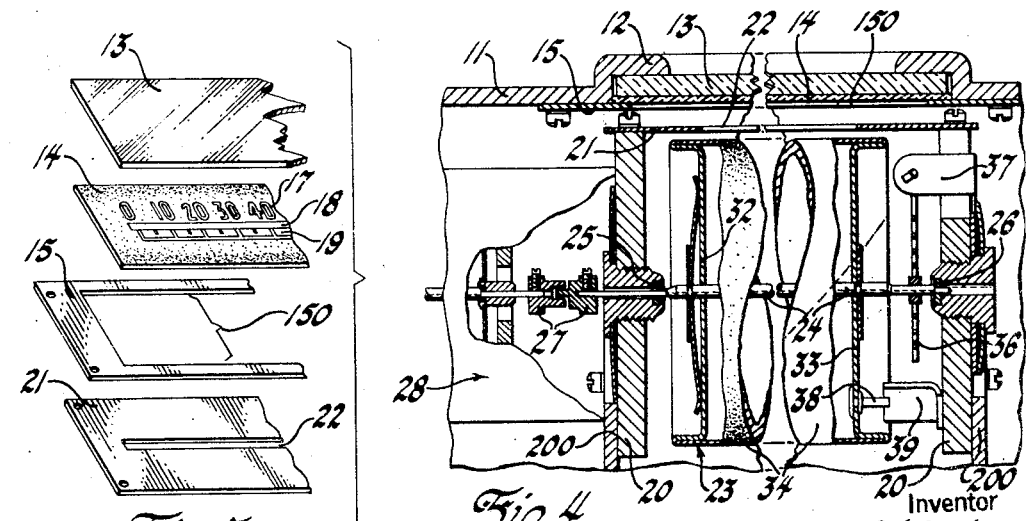
Fig. 3 is a fragmentary exploded view of the dial element employed.
Fig. 4 is an enlarged horizontal sectional view similar to Fig. 2, indicating the construction more clearly.

Within the casing 10 are a pair of longitudinally spaced end plates 20 mounted on brackets 200, the said end plates 20 being maintained in their proper spaced relationship by struts, not shown. On the front of the end plates 20 is mounted a face plate 21 longitudinally slotted at 22 opposite the translucent horizontal band 18 of the indicia element 14. Journaled in the end plates 20 is an indicator drum assembly 23 including an indicator drum shaft 24 which is preferably mounted on jeweled bearings 25 and 26. The left end of the indicator drum shaft 24 as best shown in Fig. 4 extends through the jeweled bearing 25 and is coupled by suitable coupling means 27 to a conventional speedometer drive unit generally designated by the numeral 28, which unit may be driven by a flexible shaft 29 connected through a right-angle adapter 30. The longitudinally disposed indicator drum shaft 24 is preferably disposed substantially opposite and in alignment with the horizontal center of the horizontal band 18 of the indicia element 14 and the horizontal center of the longitudinal slot 22 of the face plate 21 opposite the horizontal band 18 of the indicia element 14, although the arrangement may be oriented so that the said horizontal band 18 and the said longitudinal slot 22 may be radially disposed from the indicator drum shaft generally in the direction of the average eye level of the driver of the motor vehicle equipped with an in-line speedometer indicator embodying the invention.

The indicator drum assembly 23 comprises two end discs 32 and 33 suitably fixed to the indicator driven shaft 24 over which is mounted a lock-seam drum element 34 which is painted in contrasting colors, for example, half white at 340 and half red at 341, the junction of the contrasting colors providing a spiral line 35. The indicator drum assembly 23 is spring urged to its zero speed registry position by a spiral hair spring 36 anchored at one end to the indicator drum shaft 24 and at its other end to a tab 37 fixed to the adjacent end plate 20, see the right hand portion of Fig. 4. The end disc 33 of the indicator drum assembly 23 carries a stop pin 38 cooperating with a stop tab 39 fixed to the adjacent end plate 20, the purpose of which is to limit the rotary movement of the indicator drum assembly 23 by the hair spring 36 to its zero indicating position. The drum element 34 of the indicator drum assembly 23 is preferably positioned closely adjacent the longitudinally slotted face plate 21.

When the vehicle speed is zero the indicator drum assembly 23 is in its zero indicating position, and no showing is made of the spiral markings on the drum element 34 through the horizontal translucent band 14 of the indicia element 14. When the vehicle is under forward motion, the speed thereof is indicated by the turning of the indicator drum assembly 23 by the speedometer drive unit 28. When the indicator drum assembly 23 is so turned, the indicator drum presents a red column 40 visually traveling along the translucent horizontal band 18 of the indicia element 14 in thermometer style, movement to the right as viewed in Fig. 1 representing an increase in vehicle speed while movement to the left represents a decrease in vehicle speed.

The right hand end of the traveling column 40 as viewed in Fig. 1 through the translucent horizontal band 18 is always diagonally pointed at 41 toward the lower graduations 19 of the indicia element 14, thus providing a precise indication of the speed at which the vehicle is driven. Reading of the in-line speedometer indicator is extremely easy by virtue of the location of the numerical indicia 17 above the translucent horizontal band 18 of the indicia element 14 and the graduations 19 therebelow coupled with the movement of the red column 40 therebetween, the red column 40 presenting a precise point 41 to the lower graduations 19. As illustrated in Fig. 1, the in-line speedometer indicator is indicating a vehicle speed of 20 miles per hour.

The in-line speedometer indicator may be lighted in any suitable manner either by direct or indirect lighting to provide adequate visibility to the driver of the vehicle, particularly during after-dark driving. Also, other coloring of the portions 340 and 341 of the indicator drum 34 may be employed. When indirect lighting is employed within the casing 10, the use of the face plate 21 spaced from the indicator drum 34 and from the indicia element 14 permits a glow light to pass through the numerical and graduated indicia of the indicia element in addition to illuminating that portion of the indicator drum opposite the slot 22 in the face plate 21.

Although but one embodiment of the invention has been shown in the drawing and described in detail, it is obvious that many changes may be made in the size, shape, arrangement and construction of the various elements of the invention without departing from the spirit and scope thereof as defined by the appended claims.

I claim:

1. In an in-line speedometer indicator of the type having a casing employing indirect lighting therein and mountable in a horizontal position on the instrument panel of a vehicle, said casing including a face panel having a window therein and an indicia plate behind said window having a translucent portion and both numerical and graduated indicia therealong adapted to be illuminated from indirect lighting within the casing, an indicator drum assembly journaled on a horizontal axis behind the translucent portion of said indicia plate including a drum of contrasting colors presenting a spiral line at the junction of said contrasting colors, an opaque shield plate located between said indicia plate and said drum and having a horizontally disposed slot therein to permit viewing of said drum only through said slot and a corresponding translucent portion of said indicia plate, and means turning said drum responsive to the speed at which the vehicle is driven presenting said drum as a visual continuous column of one of said contrasting colors traveling along said translucent portion of said indicia plate, said column generally indicating the vehicle speed of travel by the position of the column in relationship to the numerical indicia with a point at the end of said column directed to the said graduated indicia precisely indicating the vehicle speed of travel.

2. In an in-line speedometer indicator for indicating the speed of a vehicle and mountable in a horizontal position on the instrument panel thereof comprising, in combination, a casing having an elongated opening therein, an indicia plate mounted in said casing behind said opening and having a translucent portion with graduated and numerical indicia therealong, an indicator drum having a spindle rotatably mounted in said casing on an axis parallel to said opening, an opaque shield plate located between said indicia plate and said drum and having a horizontally disposed slot therein to permit viewing of the drum only through said slot and a corresponding translucent portion of said indicia plate, a speedometer drive unit coupled to said drum and spring means having an end fixed to said spindle and its other end fixed to said casing, the surface of said drum being ruled in contrasting colors presenting a spiral line at the junction of said colors so that when viewed through said translucent portion and said slot the visible portion of the drum is presented as a continuous space index resembling a movable thermometer column of one of said contrasting colors which indicates generally the vehicle speed of travel by the length and the position of the column with respect to said numerical indicia, said index presenting different portions of the same spiral line in sequence in said opening with the end of said index pointing to said graduated indicia and indicating the precise speed of said device.

3. In an in-line speedometer indicator for indicating the speed of a vehicle and mountable in a horizontal position on the instrument panel thereof comprising, in combination, a casing having an elongated opening therein, a generally opaque indicia plate mounted in said casing behind said opening and having a translucent band with translucent graduated and numerical indicia therealong, an indicator drum having a spindle rotatably mounted in said casing on an axis parallel to said opening, an opaque shield plate located between said indicia plate and said drum and having a horizontally disposed slot therein in substantial alignment with said translucent band of said indicia plate to permit viewing of the drum only through said translucent band and said slot, a speedometer drive unit coupled to said drum and spring means having an end fixed to said spindle and its other end fixed to said casing, the surface of said drum being ruled in contrasting colors presenting a spiral line at the junction of said colors so that when viewed through said band and said slot the visible portion of the drum is presented as a continuous space index resembling a movable thermometer column of one of said contrasting colors which indicates generally the vehicle speed of travel by the length and the position of the column with respect to said numerical indicia, said index presenting different portions of the same spiral line in sequence in said opening with the end of said index pointing to said graduated indicia and indicating the precise speed of said device.

References Cited in the file of this patent

UNITED STATES PATENTS

| | | |
|---|---|---|
| 1,384,809 | Smith | July 19, 1921 |
| 1,532,548 | Ramsey | Apr. 7, 1925 |
| 1,672,666 | Walsh | June 5, 1928 |
| 1,797,772 | Hickman | Mar. 24, 1931 |
| 2,272,574 | Nothe | Feb. 10, 1942 |
| 2,309,941 | Drummond | Feb. 2, 1943 |
| 2,394,287 | Bludworth | Feb. 5, 1946 |
| 2,561,508 | Gregorie | July 24, 1951 |
| 2,678,621 | Proctor | May 18, 1954 |

FOREIGN PATENTS

| | | |
|---|---|---|
| 206,232 | Great Britain | Nov. 1, 1923 |
| 401,784 | Great Britain | Nov. 23, 1933 |